(12) United States Patent
Swart et al.

(10) Patent No.: US 10,282,537 B2
(45) Date of Patent: May 7, 2019

(54) SINGLE PROMPT MULTIPLE-RESPONSE USER AUTHENTICATION METHOD

(71) Applicant: INTERNATIONAL BUSINESS MACHINES CORPORATION, Armonk, NY (US)

(72) Inventors: Calvin B. Swart, Poughkeepsie, NY (US); Sharon M. Trewin, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 15/270,096

(22) Filed: Sep. 20, 2016

(65) Prior Publication Data

US 2018/0082052 A1 Mar. 22, 2018

(51) Int. Cl.
*G06F 21/40* (2013.01)
*G06F 21/31* (2013.01)
(Continued)

(52) U.S. Cl.
CPC .......... *G06F 21/40* (2013.01); *G06F 21/316* (2013.01); *G06F 21/32* (2013.01); *G06F 21/36* (2013.01);
(Continued)

(58) Field of Classification Search
None
See application file for complete search history.

(56) References Cited

U.S. PATENT DOCUMENTS 6,687,823 B1 * 2/2004 Al-Salqan ............... G06F 21/40
713/159
7,636,855 B2 12/2009 Applebaum et al.
(Continued)

FOREIGN PATENT DOCUMENTS

EP 2560122 A1 2/2013
IN 1947DEL2015 A 12/2016

OTHER PUBLICATIONS

Takada et al., "Awase-E: Image-Based Authentication for Mobile Phones Using User's Favorite Images," Human-Computer Interaction with Mobile Devices and Services Lecture Notes in Computer Science vol. 2795, 2003, pp. 347-351 (Abstract only).
(Continued)

*Primary Examiner* — Kaveh Abrishamkar
(74) *Attorney, Agent, or Firm* — Nicole A. Spence (57) ABSTRACT

A request for authentication from a user of a computer system is received. An authentication prompt is transmitted to the user, wherein the authentication prompt corresponds to a plurality of stored authentication responses, and wherein each of the plurality of stored authentication responses is used to authenticate the user. A first user authentication response is received. Whether to accept the first user authentication response based on a degree of similarity between the first user authentication response is determined and a stored authentication response from the plurality of stored authentication responses. Responsive to accepting the first user authentication response, a security score is calculated representing a level of confidence with respect to verifying the user for authentication, based on a type of authentication response for the first user authentication response. Responsive to determining that the security score is greater than an authentication score the user is authenticated.

20 Claims, 7 Drawing Sheets

(51) Int. Cl.
*H04L 29/06* (2006.01)
*G06F 21/36* (2013.01)
*G06F 21/32* (2013.01)
*G06F 21/62* (2013.01)

(52) U.S. Cl.
CPC .............. *H04L 63/08* (2013.01); *H04L 63/10* (2013.01); *H04L 63/102* (2013.01); *G06F 21/31* (2013.01); *G06F 21/6218* (2013.01)

(56) References Cited

U.S. PATENT DOCUMENTS

| | | | |
|---|---|---|---|
| 7,676,829 B1 | 3/2010 | Gui et al. | |
| 7,886,346 B2 | 2/2011 | Sandhu et al. | |
| 8,185,646 B2 | 5/2012 | Headley | |
| 8,190,129 B2 | 5/2012 | Ayed | |
| 8,255,223 B2 | 8/2012 | Wang | |
| 8,311,838 B2 | 11/2012 | Lindahl et al. | |
| 8,832,813 B1* | 9/2014 | Cai | G06F 21/32 726/7 |
| 9,122,850 B2 | 9/2015 | Tse et al. | |
| 9,485,237 B1* | 11/2016 | Johansson | H04L 63/08 |
| 2007/0101418 A1* | 5/2007 | Wood | G06F 21/31 726/8 |
| 2009/0320124 A1 | 12/2009 | Taxier et al. | |
| 2010/0293608 A1* | 11/2010 | Schechter | G06F 17/2785 726/8 |
| 2013/0227651 A1* | 8/2013 | Schultz | G06F 21/32 726/4 |
| 2013/0232542 A1* | 9/2013 | Cheng | G06F 21/6218 726/1 |
| 2015/0347725 A1* | 12/2015 | Ben Ari | G06F 21/31 726/19 |
| 2016/0087957 A1* | 3/2016 | Shah | H04L 63/205 726/1 |
| 2016/0098550 A1* | 4/2016 | Lam | G06F 21/32 726/18 |
| 2017/0048230 A1 | 2/2017 | Johansson et al. | |
| 2017/0124385 A1* | 5/2017 | Ganong | G06F 17/30244 |
| 2017/0180332 A1* | 6/2017 | Cheng | H04L 63/0428 |
| 2018/0060549 A1* | 3/2018 | Gonser | G06Q 20/3825 |

OTHER PUBLICATIONS

Mell et al., "The NIST Definition of Cloud Computing", National Institute of Standards and Technology, Special Publication 800-145, Sep. 2011, pp. 1-7.

Clarke et al., "Advanced User Authentication for Mobile Devices," Computers & Security, Mar. 2007, p. 109-119, vol. 26, Issue 2, Elsevier Ltd.

Takada et al., "Awase-E: Image-Based Authentication for Mobile Phones Using User's Favorite Images," Human-Computer Interaction with Mobile Devices and Services (Mobile HCI 2003), Sep. 2003, p. 347-351, LNCS 2795, Springer-Verlag Berlin Heidelberg.

* cited by examiner

SINGLE PROMPT MULTIPLE-RESPONSE USER AUTHENTICATION METHOD

STATEMENT REGARDING GOVERNMENT RIGHTS

This invention was made with Government support under Contract No.: FA8750-12-C-0265 awarded by U.S. Air Force, Office of Scientific Research. The Government has certain rights in this invention.

BACKGROUND OF THE INVENTION

The present invention relates generally to user authentication, and more particularly to authenticating users based on user responses to a pre-selected authentication prompt.

User authentication is a security measure implemented to protect confidential information provided by a service, or to prevent unauthorized access to service tasks, such as bank wire transfers. A user can provide passwords, gestures, PIN codes, and biometrics as a means for user authentication, where each type of response can have unique strengths and weaknesses in terms of reliability, observability, memorability, efficiency, and usability in different user authentication environments.

SUMMARY

Embodiments of the present invention provide methods, computer program products, and computer system for single-prompt multiple-response user authentication. A request for authentication from a user of a computer system is received. An authentication prompt is transmitted to the user, wherein the authentication prompt corresponds to a plurality of stored authentication responses, and wherein each of the plurality of stored authentication responses is used to authenticate the user. A first user authentication response is received. Whether to accept the first user authentication response based on a degree of similarity between the first user authentication response is determined and a stored authentication response from the plurality of stored authentication responses. Responsive to accepting the first user authentication response, a security score is calculated representing a level of confidence with respect to verifying the user for authentication, based on a type of authentication response for the first user authentication response. Responsive to determining that the security score is greater than an authentication score the user is authenticated.

DETAILED DESCRIPTION

Web services such as online banking services, online social media services, and online shopping services may require user authentication prior to granting a user access to content provided by the web services. Furthermore, web services may also require user authentication prior to granting the user access to manage (e.g., initiate, monitor, modify) web service tasks. For example, if an authentication system successfully authenticates a user of a computer system for access to an online banking service, then the user may use the computer system to view and/or edit sensitive personal and financial information, as well as perform various online banking service tasks, such as initiate money transfers. User authentication is implemented to prevent non-authorized persons from accessing content provided by the web services and to prevent non-authorized persons from performing various tasks using the web services. For example, if an authentication system does not authenticate a user of a computer system for access to an online banking service, then the user may not view and/or edit sensitive personal and financial information not perform any of the various online banking tasks.

In certain instances, each web service or web service task, may require a distinctive user authentication process for verifying a user's identity. For example, an online social media service may rely on a user authentication process requiring a user's log-in name and password. In another example, an online banking service may rely on a user authentication process requiring a user to provide the user's log-in name, password, as well as an additional response, such as biometric feedback (e.g., a fingerprint). In this example, if the user is authenticated via an authentication process, granted access to the online banking service, and then subsequently requests to make a money transfer, then the online banking service may rely on an additional authentication process, whereby verifying that the attempted money transfer is requested by the previously authenticated user.

An authentication environment can be implemented to authenticate a user of a computer system before granting the user access to a web service, such that an authenticated user has access to content provided by the web service and/or the authenticated user can manage web service tasks. An authentication environment can involve two process, an initial enrollment process and a subsequent authentication process. For example, an enrollment process can be used to collect user enrollment information for a particular web service and/or web service task, where the enrollment information may include identifiers for the web service and web service task, one or more authorization prompts for the web service and web service tasks, and one or more responses for each authorization prompt, as described in greater detail below. Subsequently, an authentication process can be used to authenticate a user of a computer system prior to granting the user access to a particular web service and/or web service tasks, based on the previously collected user enrollment information for the particular web service and/or web service tasks. For example, the authentication process may initiate when a user attempts to access a web service and/or web service task, and subsequently may involve prompting the user with a pre-selected authentication prompt that corresponds to a respective web service and/or web service task. In this example, after the user is prompted with the authentication prompt, the computer system can then receive responses for the pre-selected authentication prompt, and determine whether to authenticate the user based on a comparison between the received responses and the responses included in the previously stored enrollment information, as described in greater detail below.

Embodiments of the present invention will now be described below with reference to the accompanying Figures (FIGS.). In the following description, elements that are identical are referenced by the same reference numbers in all the FIGS. unless noted otherwise. The configurations explained herein are provided as preferred embodiments, and it should be understood that the technical scope of the present invention is not intended to be limited to these embodiments.

Figure 1:
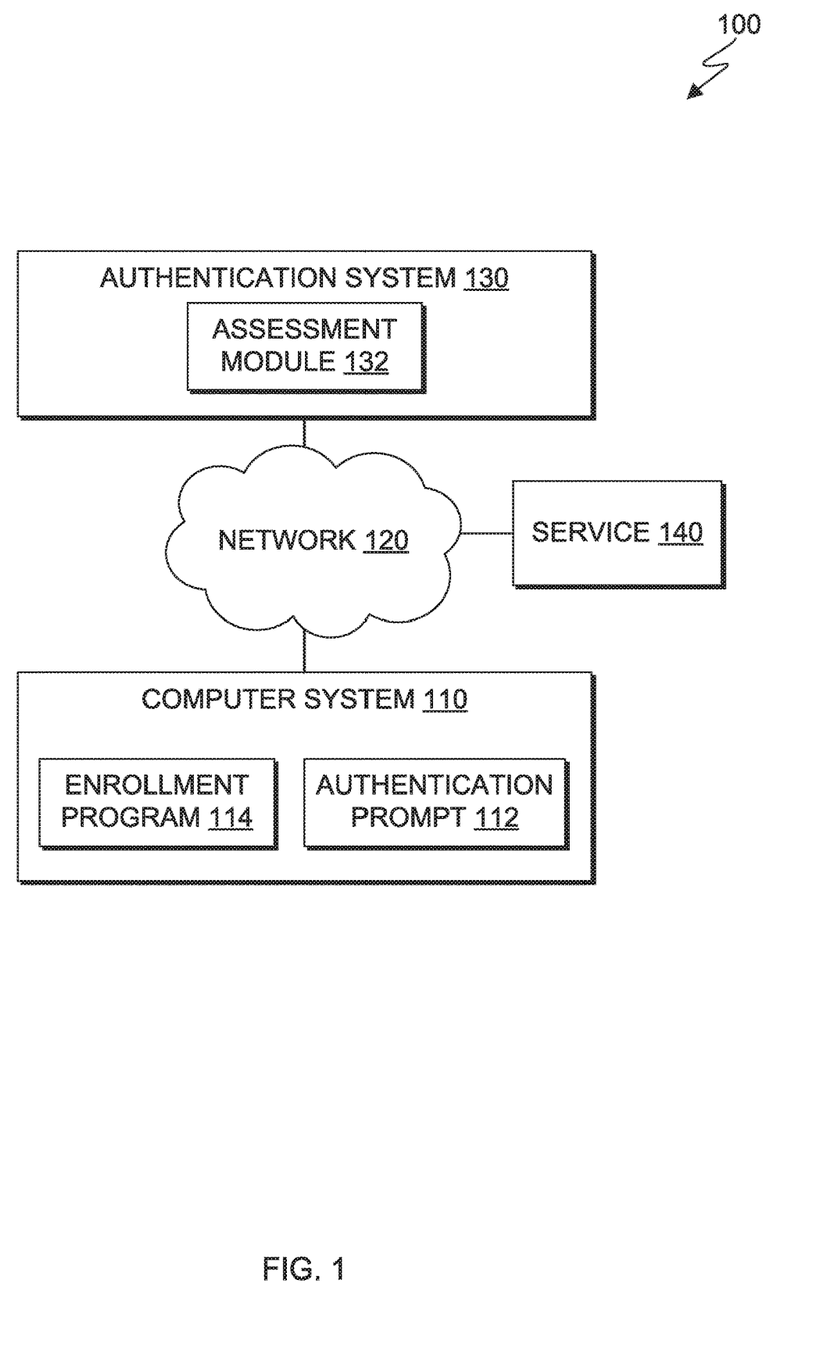
FIG. 1 is a functional block diagram illustrating an authentication environment, in accordance with an embodiment of the present invention.

FIG. 1 is a functional block diagram illustrating authentication environment 100, in accordance with an embodiment of the present invention. Authentication environment 100 includes computer system 110 and authentication system 130. Computer system 110 and authentication system 130 can be desktop computers, laptop computers, specialized computer servers, or the like. In certain embodiments, computer system 110 and authentication system 130 represent computer systems utilizing clustered computers and components to act as a single pool of seamless resources when accessed through network 120. In certain embodiments, computer system 110 and authentication system 130 represent virtual machines. In general, computer system 110 and authentication system 130 are representative of any electronic devices, or combination of electronic devices, capable of executing machine-readable program instructions, as described in greater detail with regard to FIG. 5. In other embodiments, computer system 110 and authentication system 130 may be implemented in a cloud computing environment, as described in greater detail with regard to FIGS. 6 and 7.

Network 120 can be, for example, a local area network (LAN), a wide area network (WAN) such as the Internet, or a combination of the two, and include wired, wireless, or fiber optic connections. In general, network 120 can be any combination of connections and protocols that will support communications between computer system 110, authentication system 130, and web service 140, in accordance with a desired embodiment of the invention.

Computer system 110 represents a platform configured to exchange information between authentication system 130 and web service 140 over network 120. A user of computer system 110 can interact with computer system 110 to provide various user inputs, or responses, as described in greater detail below. In this embodiment, a user of computer system 110 uses computer system 110 to request access to content provided by web service 140 and/or access to web service 140 tasks. Furthermore, computer system 110 includes enrollment program 112 and authentication prompt 112, as described in greater detail below.

Authentication prompt 112 represents an alert or notification that is initially selected during an enrollment process and subsequently transmitted (e.g., presented, communicated, etc.) to a user of computer system 110 during an authentication process. Authentication prompt 112 can include an image, animation, text content, and/or video presented on a display of computer system 110, one or more vibrations and/or a vibration pattern performed by computer system 110, an audio signal broadcasted on a speaker component of computer system 110, one or more light signals and/or a light signal pattern emitted by a camera flash component of computer system 110 and/or a light status component of computer system 110, and/or combinations thereof.

In this embodiment, a user of computer system 110 selects authentication prompt 112 during an enrollment process for web service 140 and/or a web service 140 task. Subsequently, during an authentication process for web service 140 and/or the web service 140 task, computer system 110 will prompt authentication prompt 112, as described in greater detail below. For example, a user of computer system 110 can select an image stored in computer system 110 as authentication prompt 112. In another example, the user of computer system 110 can upload an image in combination with an audio file as authentication prompt 112. In general, authentication prompt 112 can be any signal from computer system 110 user that can notify a user that information is necessary, such as, for example, a visual signal, an audio signal, a tactile signal, or combinations thereof.

In another embodiment, authentication prompt 112 can be automatically selected by computer system 110 during an enrollment process. For example, computer system 110 may automatically select authentication prompt 112 to be a sequence of five vibrations performed by computer system 110 followed by a flash of light emitted by the camera flash component of computer system 110. In another example, computer system 110 can automatically select an image stored in computer system 110, or another database containing generic images, as authentication prompt 112.

Enrollment program 114 represents a software program configured to receive enrollment information during an enrollment process. In this embodiment, enrollment program 114 receives enrollment information by requesting a user of computer system 110 to select authentication prompt 112 for web service 140 and/or a web service 140 task, designate an authentication mode, and provide a response (e.g., password) in the designated authentication mode for the selected authentication prompt 112, as described in greater detail with regard to FIG. 2. Enrollment program 114 can store received enrollment information in authorization system 130, such that the enrollment information can be used during a subsequent authentication process, as described in greater detail with regard to FIG. 3.

An authentication mode indicates an acceptable format of responses for a selected authentication prompt 112. For example, an authentication mode can indicate that an acceptable format of responses includes one or more of: an audio signal (e.g., a spoken phrase), a graphical image (e.g., a captured image of the user's face), a text input (e.g., a user typed response), a screen gesture (e.g., one-touch and multi-touch gestures), a motion path of computer system 110 (e.g., whole-device gesture), another physical interaction performed by a user of computer system 110 with computer system 110 (e.g., tapping the display of computer system 110), biometric data, and combinations thereof. For example, enrollment program 114 may receive enrollment information for web service 140, where the designated authentication mode of responses for a selected authentication prompt 112 is an audio signal, such as a spoken phrase. In this example, enrollment program 114 will not accept a user-defined motion path of computer system 110 as a potential response for the selected authentication prompt 112, because the user-defined motion path is not in the acceptable format indicated by the designated authentication (i.e., not an audio signal). Accordingly, for this particular authentication mode, enrollment program 114 will only accept audio signals as responses for the selected authentication prompt 112.

In one embodiment, enrollment program 114 may require confirmation that enrollment information received by enrollment program 114 is correct. For example, before enrollment program 114 stores responses provided during an enrollment process, the user may be required to reenter the responses a number of times (e.g., two times) to confirm that the responses are correct. It should be understood that a user of computer system 110 can designate more than one authentication mode of responses to enrollment program 114 as well as provide any number of responses for each authentication mode, as described in greater detail below.

Authentication system 130 represents a platform configured to authenticate a user of computer system 110 for web service 140 and/or a web service 140 task. In certain embodiments, if more than one user interacts with computer system 110 to access more than one web service 140 and/or web service 140 task, then enrollment information stored in authentication system 130 will include enrollment information for each of the more than one users with respect to each of the more than one web service 140 and/or web service 140 task. For example, a first user's enrollment information for a first web service 140 (e.g., an online banking service) may include a first authentication prompt 112 (e.g., an image), a first mode of authentication (e.g., audio signals) and corresponding responses (e.g., spoken phrases). In this example, a second user's enrollment information for the first web service 140 may include a second authentication prompt 112 (e.g., an audio signal broadcasted by computer system 110), a second mode of authentication (e.g., text input) and corresponding response (e.g., text content). Furthermore, in this example, the first user's enrollment information for a web service 140 task (e.g., uploading an image to a social media service) may include a third authentication prompt 112 (e.g., a vibration sequence), a third mode of authentication (e.g., multi-touch display interactions), and corresponding responses (e.g., multi-touch gestures). In this embodiment, authentication system 130 includes assessment module 132, as described in greater detail below.

Assessment module 132 represents a software program configured to determine various metrics for enrollment information, and to determine whether to authenticate a user of computer system 110 for web service 140 and/or a web service 140 task. In this embodiment, assessment module 132 evaluates each response received during an enrollment process for web service 140 and/or a web service 140 task, and determines a confidence metric for the response. A confidence metric of a response is a value that indicates a relative complexity of the response with respect to authenticating a user. For example, assessment module 132 may determine that a first response (e.g., a three digit password) may be less secure than a second response (e.g., a ten character alpha-numeric password), because the second response is considered is more secure (i.e., more difficult to guess or hack).

In this embodiment, assessment module 132 is implemented during an authentication process, such that when a user of computer system 110 provides responses to a presented authentication prompt 112, assessment module 132 determines whether the provided responses match, or match to a degree of similarity, the responses stored during the enrollment process within a specified threshold. A specified threshold for a response is defined by assessment module 132 during an enrollment process, and is based on the mode of authentication for the respective response. For example, text input responses may have a relatively lower specified threshold (i.e., a smaller acceptable margin of error) because text input responses are easily repeatable. In another example, audio signal responses may have a relatively higher specified threshold (i.e., a larger acceptable margin of error) because audio signals are more difficult to repeat, even if the same user provides the audio signal via a spoken phrase, due to deviations in rhythm, tone, annunciation, pronunciation, etc. Stated differently, assessment module 132 can compare a response received during an authentication process with a response previously received during an enrollment process for web service 140 and/or a web service 140 task, and determine if the response received during the authentication process matches the stored response within a specified threshold that is associated with the stored response. If assessment module 132 determines that the response received during the authentication process sufficiently matches the stored response, then assessment module 132 accepts the response and can proceed with determining whether to authenticate the user based on the accepted response, as described in greater detail below.

Subsequently, during an authentication process, as a user provides responses to a presented authentication prompt 112, assessment module 132 may sum the confidence levels associated with the provided responses to determine a security score, as described in greater detail below. In one embodiment, a security score may represent a level of confidence with respect to verifying the user for authentication based on a type of response, or confidence level. A confidence level for a particular response is a metric indicating various parameters of the particular response, such as password entropy (i.e., a measurement of how unpredictable a password or response is) and/or password strength (i.e., an indicator of the relative strength of the password/response or how resistant a password/response might be to cracking attempts using brute force and/or dictionary attacks). Assessment module 132 can also set an authentication score, which represents a required security score to be met during an authorization process, whereby granting a user access to requested information from a particular service 140, as described in greater detail below. Furthermore, assessment module 132 stores the authentication score for each service 140 in authentication system 130.

Service 140 represents a content provider requiring authentication of a user of computer system 110 by authorization system 130 prior to providing content to the user. Service 140 can be a web service, such as a social media service, an online banking service, product order fulfillment service, or any other web service that can provide a user with privileged, secured, or personal information upon authentication. As previously described, certain content provided by service 140 and/or service 140 tasks can have varying authentication scores. For example, the assessment module 132 may determine service 140 task, such as money transfers completed using service 140 (e.g., a financial institution) by a user of computer system 110 can have varying authentication scores. In this example, it may be determined that money transfers greater than $10,000 require a higher authentication score than a money transfer for $100. Accordingly, the user may provide a number of responses during an authentication process, such that the summed security score of the responses is greater than the specified authentication score, whereby granting the user access to complete the desired money transfer.

Figure 2:
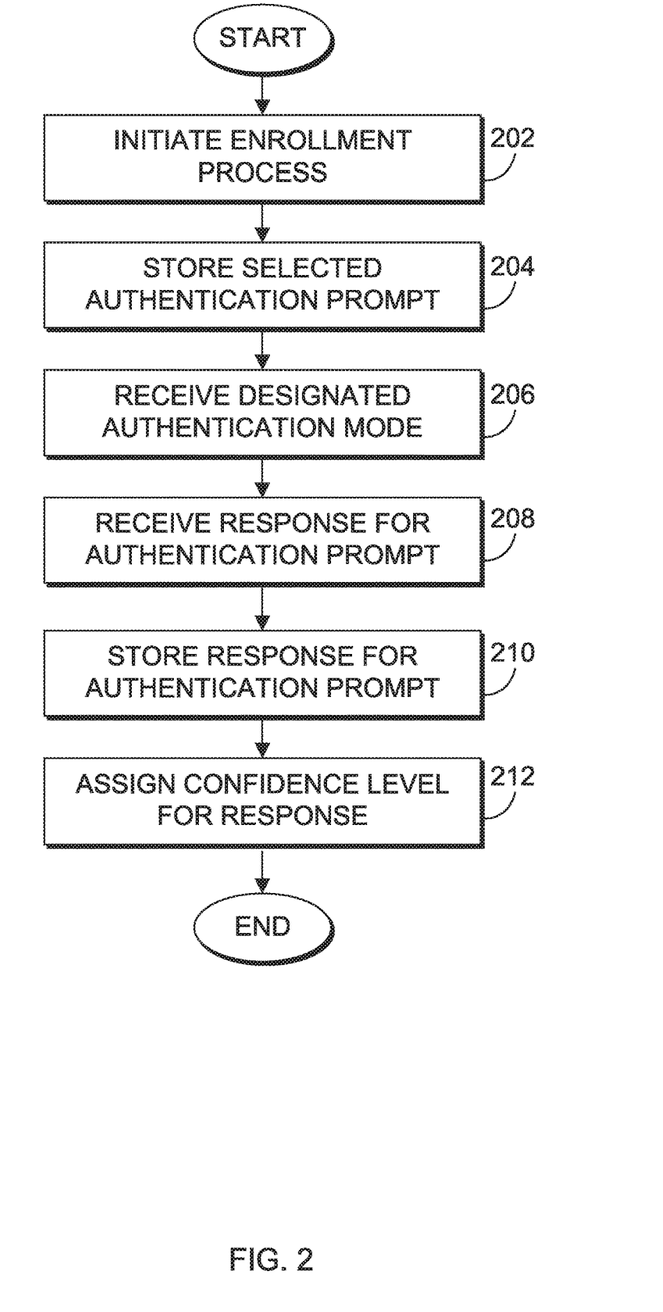
FIG. 2 is a flowchart illustrating operational steps for an enrollment process, in accordance with an embodiment of the present invention.

FIG. 2 is a flowchart illustrating operational steps for enrollment in authentication environment 100, in accordance with an embodiment of the present invention. To initiate an enrollment process in authentication environment 100, computer system 110 executes enrollment program 114 (step 202). After enrollment program 114 is executed, computer system 110 stores a selected authentication prompt 112 in authentication system 130 (step 204). In one embodiment, a user of computer system 110 can select authentication prompt 112 for the enrollment process, such that the selected authentication prompt 112 can be presented to the user during a subsequent authentication process. In another embodiment, computer system 110 automatically selects authentication prompt 112, such that the automatically selected authentication prompt 112 can be presented to the user during a subsequent authentication process. For example, computer system 110 may automatically select an image as authentication prompt 112 from a database of generic images stored on either computer system 110, authentication system 130, or another computer system.

After authentication prompt 112 is selected and stored, then computer system 110 receives an authentication mode designated by the user (step 206). Once the authentication mode selection is made by the user, computer system 110 can receive a response (e.g., a user-defined password) for the selected authentication prompt 112 in the designated authentication mode (step 208). Computer system 110 then stores the response for the selected authentication prompt 112 in authentication system 130 along with the designated authentication mode for the response (step 210). Subsequently, assessment module 132 can evaluate the response, assign a confidence level for the response, and store the confidence level for the response in authentication system 130 (step 212).

Figure 3:
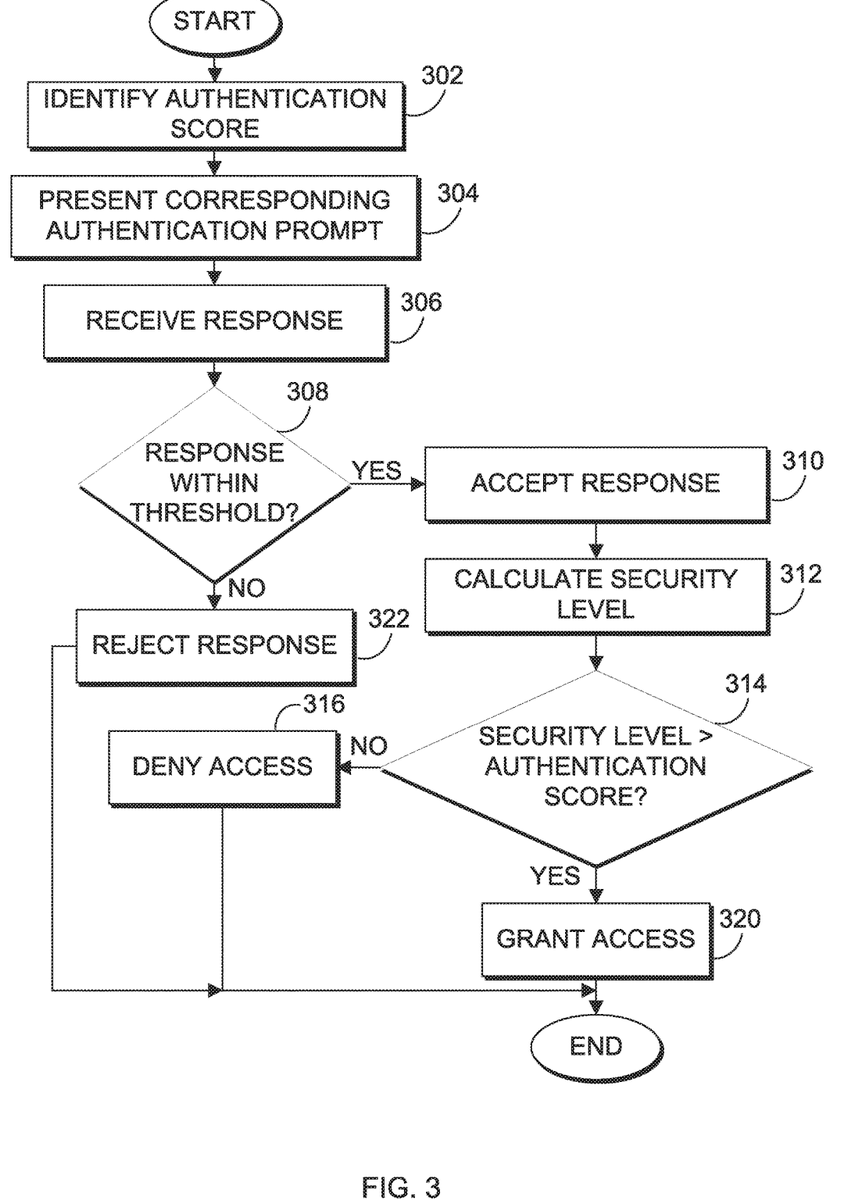
FIG. 3 is a flowchart illustrating operational steps for an authentication process, in accordance with an embodiment of the present invention.

FIG. 3 is a flowchart illustrating operational steps for authentication of a user, in accordance with an embodiment of the present invention. Computer system 110 identifies an authentication score for a type of content requested by a user that is provided by service 140 and/or a type of service 140 task (step 302). In one embodiment, computer system 110 can identify the authentication score by accessing a storage repository of authentication system 130 storing authentication scores previously determined by assessment module 132. Subsequently, computer system 110 presents a corresponding authentication prompt 112 to a user of computer system 110 on a display of computer system 110 (step 304). In another embodiment, computer system 110 and other components therein can present authentication prompt 112 based on the type. For example, at step 304, components of computer system 110 may vibrate in accordance with a pre-selected authentication prompt 112 for the particular service 140 and/or a type of service 140 task. The user of computer system 110 then provides a response (e.g., enters the user's password) to the authentication prompt 112, and then authentication system 130 can receive the user-provided response which is transmitted by computer system 110 (step 306). Assessment module 132 can determine whether the received response is within a specified threshold for a response, where the specified threshold for the response was previously stored during an enrollment process (decision 308). If assessment module 132 determines that the received response is within the specified threshold ('yes' branch, decision 308), then assessment module 132 can accept the response for subsequent authentication processing (step 310). If assessment module 132 determines that the received response is not within the specified threshold ('no' branch, decision 308). Then assessment module 132 rejects the response for subsequent authentication processing (step 322).

It should be understood that more than one response can be provided by a user of computer system 110 during an authentication process. For example, the user may repeatedly enter the wrong password (i.e., a response is not within the specified threshold) for authentication prompt 112, in which case the user can reattempt to enter the correct password, or provide an alternative response that was previously defined by the user during the enrollment process.

In another example, a particular authentication score for user-requested content provided by service 140 may be relatively high (e.g., an authentication score of 50). In this example, the user of computer system 110 may be presented with a corresponding authentication prompt 112, as described in step 304. Subsequently, the user can provide three different passwords as three responses for authentication prompt 112. After authentication system 130 receives the three responses (e.g., passwords), as described in step 306, assessment module 132 can determine if each of the three responses are acceptable based on a respective specified threshold for each of the responses (e.g., a response that is an alphanumeric passwords may require or a near-zero threshold, a response that involves the user selecting a portion of an image of authentication prompt 112 may have a low threshold, a response that involves the user providing a spoken phrase may have a medium threshold), as described in step 310. Subsequent to accepting the three responses, as described in greater detail below, assessment module 132 may grant the user access to the requested content because the three responses satisfy the authentication score requested content.

A security score is calculated by assessment module 132 (step 312). As previously described, assessment module 132 calculates a security score by summing confidence levels for each accepted response to authentication prompt 112. For example, if three responses were accepted by assessment module 132 in step 310, then the calculated security score is the sum of confidence levels for the three accepted responses. Then, assessment module 132 determines whether the calculated security score is greater than authentication score identified for the requested content provided by service 140 and/or the requested service 140 task (step 314). If the security score is not greater than the authentication score ('no' branch, decision 314), the assessment module 132 denies the user access to the requested content provided by service 140 and/or the requested service 140 task (step 316). If the security score is greater than the authentication score ('yes' branch, decision 314), the assessment module 132 grants the user access to the requested content provided by service 140 and/or the requested service 140 task (step 320).

Figure 4A:
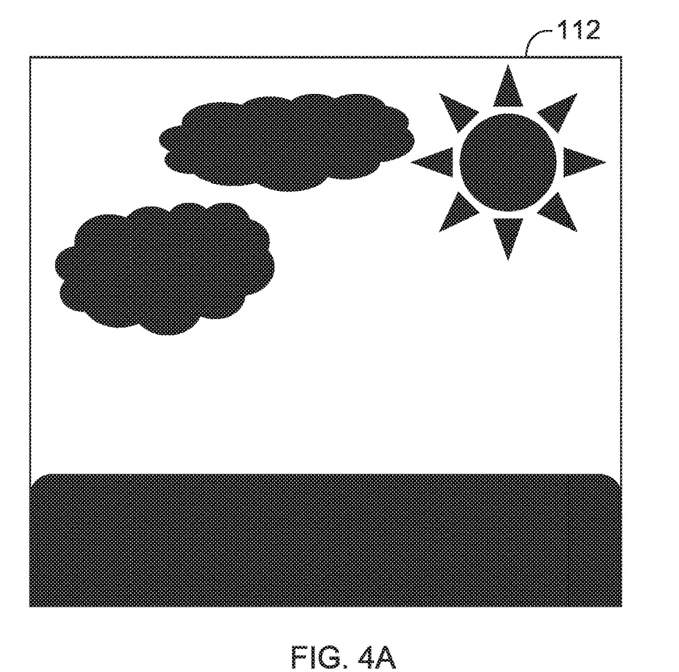
FIGS. 4A and 4B are block diagrams illustrating an example authentication prompt, in accordance with an embodiment of the present invention.

FIGS. 4A and 4B depict an example illustration of an example authentication prompt 112, in accordance with an embodiment of the present invention. Authentication prompt 112 depicted in FIG. 4A can be selected by a user of computer system 110 during an enrollment process, as previously described. Authentication prompt 112 in FIG. 4A can also be presented to the user during a subsequent authentication process, as previously described.

Figure 4B:
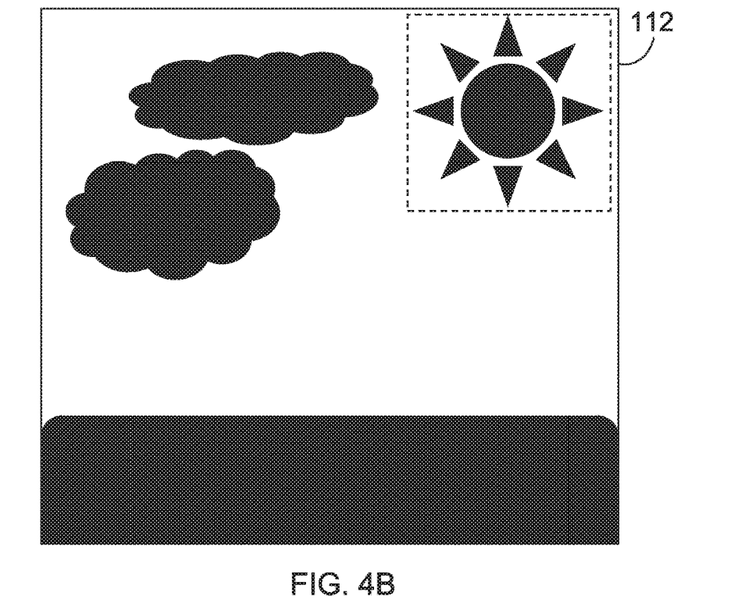

In FIG. 4B, the user may interact with a display that is presenting authentication prompt 112 and select a portion of the graphical elements (e.g., an image of a sun) as a response to authentication prompt 112. Accordingly, assessment module 132 compares this response (e.g., the selection of the sun) with a response previously stored during the enrollment process, to determine whether to accept the response and eventually authenticate the user.

The present invention implements a more flexible authentication method than typical methods provide, and the present invention provides several significant advantages. First, since a user can select an authentication method which they prefer, authentication environment 100 is accessible to people with impairments and to people who perform authentication in challenging environments. For example, in an embodiment of the present invention, a person with an impairment that limits hand coordination can select an authentication mode of spoken phrase or face picture. In another embodiment of the present invention, a person who lives in a busy city with lots of noise likely prefers a tap sequence, typed phrase, or screen gesture mode of authentication.

Second, the user-designed nature of the passwords to authentication prompt 112 helps users remember how to complete an authentication process. Furthermore, the user-designed nature of passwords to authentication prompt 112 is of no help to a potential attacker. For example, an image authentication prompt 112 of a house helps a user remember a spoken phrase password relating to their home, family, or a specific text. Users no longer need to remember number passwords or words containing a certain number or sequence of characters and letters. Since several responses are associated with a single authentication prompt 112, the responses can serve to strengthen the user's memory of the response set. An attacker upon seeing an image authentication prompt 112 would be unaware as to what password is required, in addition to what mode of authentication for the password is required.

Another advantage of the present invention is the user-designed nature of the authentication prompt 112 serves as an anti-deception mechanism. Currently mobile device users are vulnerable to websites aimed at gaining their sensitive information. Mobile devices permit people to access their emails. It is more difficult on a mobile device to determine if a website is legitimate and users are likely to enter their login information, which usually contains PIN codes or passwords. In the present invention, the user is familiar with the prompt and it is more difficult to deceive the user. Additionally, the input password can be completely unique and contain no intimate information such as usernames, other passwords, or credit card details.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 5:
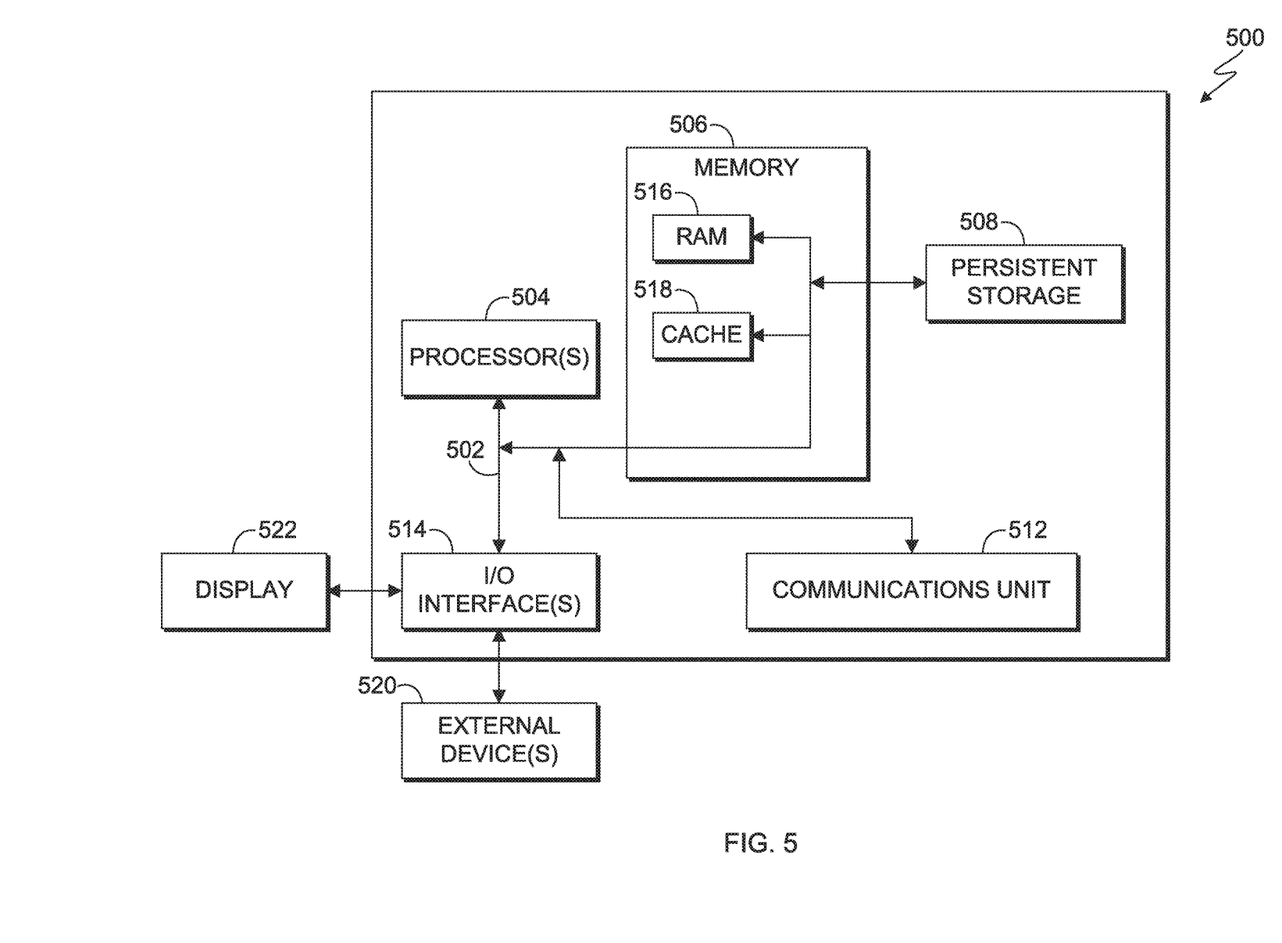
FIG. 5 is a block diagram of internal and external components of the computer systems in FIG. 1, in accordance with an embodiment of the present invention.

FIG. 5 is a block diagram of internal and external components of a computer system 500, which is representative the computer systems of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media. Software is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage b. Other examples include optical and magnetic disks, thumb drives, and smart cards that are inserted into a drive for transfer onto another computer-readable storage medium that is also part of persistent storage 508.

Communications unit 512 provides for communications with other computer systems or devices via a network (e.g., network 120). In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computer system 500. For example, I/O interface 514 can provide a connection to one or more external devices 520, such as a keyboard, computer mouse, touch screen, virtual keyboard, touch pad, pointing device, or other human interface devices. External devices 520 can also include portable computer-readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
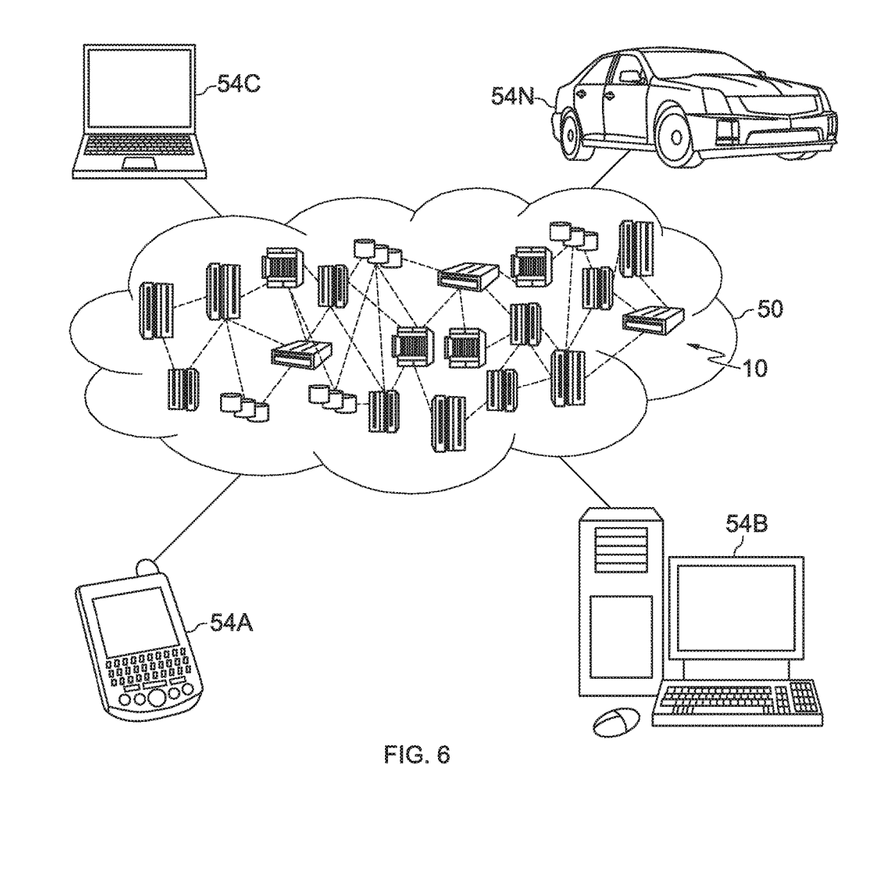
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
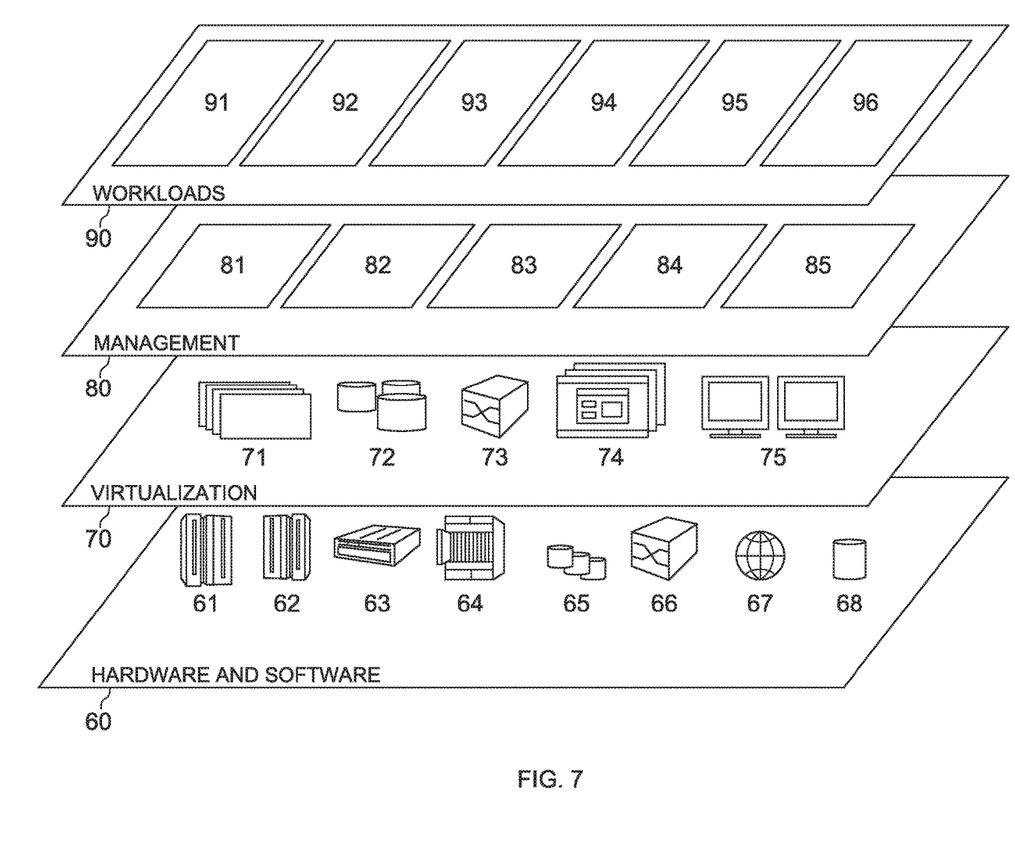
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and authentication environment 96.

What is claimed is:

1. A method comprising:
    receiving, by one or more computer processors, a request for authentication from a user of a computer system;
    transmitting, by the one or more computer processors, an authentication prompt to the user, wherein the authentication prompt corresponds to a plurality of stored authentication responses, and wherein each of the plurality of stored authentication responses is used to authenticate the user;
    selecting, by the user, a first type of authentication response from a plurality of stored authentication types used to authenticate the user, wherein the selected first type of authentication response corresponds to a first user authentication response to the transmitted authentication prompt, wherein the user selects the first type of authentication response based on a flexible user preference, wherein the flexible user preference changes based on at least one of the following:
        i. an authentication environment,
        ii. a user impairment, and
        iii. a determination by the user;
    receiving, by the one or more computer processors, the first user authentication response;
    determining, by the one or more computer processors, whether to accept the received first user authentication response based on a degree of similarity between the received first user authentication response and a stored authentication response from the plurality of stored authentication responses;
    responsive to accepting the received first user authentication response, calculating, by the one or more computer processors, a security score representing a level of confidence with respect to verifying the user for authentication, based on the selected first type of authentication response-for the first user authentication response; and
    responsive to determining that the security score is greater than an authentication score, authenticating, by the one or more computer processors, the user.

2. The method of claim 1, wherein during a prior enrollment process, the user selects the authentication prompt including at least one of: an image, an animation, text content, a video, a vibration, an audio signal, and a light signal.

3. The method of claim 1, wherein each of the plurality of stored authentication responses is assigned a metric that is used to calculate the security score, and wherein the metric is based on the first type of authentication response.

4. The method of claim 2, wherein the plurality of stored authentication responses are provided by the user during the enrollment process, and wherein the first type of authentication response of the plurality of stored authentication responses is selected from the group consisting of: an image, an audio signal, a user interaction with a component of the computer system, a video, a motion path of the computer system, user biometric data, and a sequence of alphanumeric characters.

5. The method of claim 3, further comprising:
    receiving, by the one or more computer processors, a second user authentication response; and responsive to accepting the second user authentication response based on a degree of similarity between the second user authentication response and a stored authentication response from the plurality of stored authentication response, calculating, by the one or more computer processors, the security score by summing the each of the metrics assigned to the first user authentication response and second user authentication response.

6. The method of claim 3, wherein the metric assigned to each of the plurality of stored authentication responses is based on the first type of authentication response.

7. The method of claim 3, wherein the metric assigned to each of the plurality of stored authentication responses is based on value indicating a degree of unpredictability of a respective stored authentication response and on another value indicating a relative strength of a respective stored authentication response with respect to resisting cracking attempts.

8. A computer program product comprising:
    one or more computer readable storage media and program instructions stored on the one or more computer readable storage media, the program instructions comprising:
    program instructions to receive a request for authentication from a user of a computer system;
    program instructions to transmit an authentication prompt to the user, wherein the authentication prompt corresponds to a plurality of stored authentication responses, and wherein each of the plurality of stored authentication responses is used to authenticate the user;
    program instructions to select, by the user, a first type of authentication response from a plurality of stored authentication types used to authenticate the user, wherein the selected first type of authentication response corresponds to a first user authentication response to the transmitted authentication prompt, wherein the user selects the first type of authentication response based on a flexible user preference, wherein the flexible user preference changes based on at least one of the following:
i. an authentication environment,
ii. a user impairment, and
iii. a determination by the user;
program instructions to receive the first user authentication response;
program instructions to determine whether to accept the received first user authentication response based on a degree of similarity between the received first user authentication response and a stored authentication response from the plurality of stored authentication responses;
program instructions to, responsive to accepting the received first user authentication response, calculate a security score representing a level of confidence with respect to verifying the user for authentication, based on the selected first type of authentication response-for the first user authentication response; and
program instructions to, responsive to determining that the security score is greater than an authentication score, authenticate the user.

9. The computer program product of claim 8, wherein during a prior enrollment process, the user selects the authentication prompt including at least one of: an image, an animation, text content, a video, a vibration, an audio signal, and a light signal.

10. The computer program product of claim 8, wherein each of the plurality of stored authentication responses is assigned a metric that is used to calculate the security score, and wherein the metric is based on the first type of authentication response.

11. The computer program product of claim 9, wherein the plurality of stored authentication responses are provided by the user during the enrollment process, and wherein the first type of authentication response of the plurality of stored authentication responses is selected from the group consisting of: an image, an audio signal, a user interaction with a component of the computer system, a video, a motion path of the computer system, user biometric data, and a sequence of alphanumeric characters.

12. The computer program product of claim 10, wherein the program instructions stored on the one or more computer readable storage media further comprise:
program instructions to receive a second user authentication response; and responsive to accepting the second user authentication response based on a degree of similarity between the second user authentication response and a stored authentication response from the plurality of stored authentication response, calculating, by the one or more computer processors, the security score by summing the each of the metrics assigned to the first user authentication response and second user authentication response.

13. The computer program product of claim 10, wherein the metric assigned to each of the plurality of stored authentication responses is based on the first type of authentication response.

14. The computer program product of claim 10, wherein the metric assigned to each of the plurality of stored authentication responses is based on value indicating a degree of unpredictability of a respective stored authentication response and on another value indicating a relative strength of a respective stored authentication response with respect to resisting cracking attempts.

15. A computer system comprising:
one or more computer processors;
one or more computer readable storage media;
program instructions stored on the one or more computer readable storage media for execution by at least one of the one or more processors, the program instructions comprising:
program instructions to receive a request for authentication from a user of a computer system;
program instructions to transmit an authentication prompt to the user, wherein the authentication prompt corresponds to a plurality of stored authentication responses, and wherein each of the plurality of stored authentication responses is used to authenticate the user;
program instructions to select, by the user, a first type of authentication response from a plurality of stored authentication types used to authenticate the user, wherein the selected first type of authentication response corresponds to a first user authentication response to the transmitted authentication prompt, wherein the user selects the first type of authentication response based on a flexible user preference, wherein the flexible user preference changes based on at least one of the following:
i. an authentication environment,
ii. a user impairment, and
iii. a determination by the user;
program instructions to receive the first user authentication response;
program instructions to determine whether to accept the received first user authentication response based on a degree of similarity between the received first user authentication response and a stored authentication response from the plurality of stored authentication responses;
program instructions to, responsive to accepting the received first user authentication response, calculate a security score representing a level of confidence with respect to verifying the user for authentication, based on the selected first type of authentication response-for the first user authentication response; and
program instructions to, responsive to determining that the security score is greater than an authentication score, authenticate the user.

16. The computer system of claim 15, wherein during a prior enrollment process, the user selects the authentication prompt including at least one of: an image, an animation, text content, a video, a vibration, an audio signal, and a light signal.

17. The computer system of claim 15, wherein each of the plurality of stored authentication responses is assigned a metric that is used to calculate the security score, and wherein the metric is based on the first type of authentication response.

18. The computer system of claim 16, wherein the plurality of stored authentication responses are provided by the user during the enrollment process, and wherein the first type of authentication response of the plurality of stored authentication responses is selected from the group consisting of: an image, an audio signal, a user interaction with a component of the computer system, a video, a motion path of the computer system, user biometric data, and a sequence of alphanumeric characters.

19. The computer system of claim 17, wherein the program instructions stored on the one or more computer readable storage media further comprise:

program instructions to receive a second user authentication response; and responsive to accepting the second user authentication response based on a degree of similarity between the second user authentication response and a stored authentication response from the plurality of stored authentication response, calculating, by the one or more computer processors, the security score by summing the each of the metrics assigned to the first user authentication response and second user authentication response.

20. The computer system of claim 17, wherein the metric assigned to each of the plurality of stored authentication responses is based on the first type of authentication response.

* * * * *